United States Patent [19]

Sekmakas

[11] 4,178,325

[45] Dec. 11, 1979

[54] HIGH SOLIDS COATING COMPOSITIONS CONTAINING LIQUID BISHYDROXY ETHYL ETHER OF A BISPHENOL

[75] Inventor: Kazys Sekmakas, Palatine, Ill.

[73] Assignee: DeSoto, Inc., Des Plaines, Ill.

[21] Appl. No.: 866,256

[22] Filed: Jan. 3, 1978

[51] Int. Cl.$^2$ .................. C08L 61/26; C08L 61/20
[52] U.S. Cl. ...................... 525/157; 260/33.4 P; 427/385 R; 525/163
[58] Field of Search .............. 260/856, 851, 33.4 P

[56] References Cited

U.S. PATENT DOCUMENTS

| | | | |
|---|---|---|---|
| 3,267,174 | 8/1966 | Fry et al. | 260/856 |
| 3,959,202 | 5/1976 | Blank | 260/856 |
| 4,052,480 | 10/1977 | Sekmakas | 260/856 |

Primary Examiner—John C. Bleutge
Attorney, Agent, or Firm—Dressler, Goldsmith, Clement, Gordon & Shore, Ltd.

[57] ABSTRACT

Resinous coating compositions of low volatile solvent content are provided which are sufficiently fluid to permit effective application, and which cure on baking at low temperature to provide hard stain- and detergent-resistant coatings of outstanding flexibility. These are made by copolymerizing monoethylenic monomers including monoethylenic monomer having a functional group reactive with N-methylol functionality and selected from carboxylic acid, hydroxy and amide groups, the copolymerization being carried out in a solvent solution containing a major proportion of liquid bishydroxy ethyl ether of a bisphenol, alone or together with the corresponding bishydroxy propyl ether. The copolymer solution has added thereto an aminoplast resin to provide a stable solution in which proportions are important so that coatings can be easily applied and cured to provide the desired characteristics without liberating excessive amounts of volatile material.

9 Claims, No Drawings

HIGH SOLIDS COATING COMPOSITIONS CONTAINING LIQUID BISHYDROXY ETHYL ETHER OF A BISPHENOL

The present invention relates to essentially solvent free resinous coating compositions which are sufficiently fluid to permit effective application and which cure on baking at relatively low temperature to provide hard, flexible, adherent, and chemically resistant coatings. Coatings which cure to provide excellent stain and detergent resistance are particularly contemplated to provide coatings suited for use as appliance finishes. Container coatings and construction coatings are also contemplated.

The invention is a modification of the invention disclosed in my prior U.S. Pat. No. 4,052,480, issued Oct. 4, 1977 for the purpose of maximizing the fluidity of the coating composition and the flexibility of the cured coatings with minimum reduction in film hardness and chemical resistance.

The present trend in coating technology is to minimize the proportion of volatile organic solvent in the liquid coating composition which is applied, and one way to do this is to provide the needed fluidity using a high boiling reactive liquid which combines chemically with the more resinous components in order to become a permanent component of the final cured film. To this end, efforts have been made to use dihydric or trihydric alcohols as the reactive liquids for the cure of reactive copolymers, but good stain resistance and good detergent resistance have not been attainable in this fashion. These efforts are illustrated by U.S. Pat. Nos. 3,267,174; 3,352,806; and 3,920,595.

Another difficulty is the hardness and flexibility of the cured coatings. Generally, when dihydric alcohols are used as the reactive liquids, the film hardness falls off and the coatings are softer than desired. With tetrahydric alcohols, the proportion of use is limited because of the tendency toward film brittleness, so proportions must be carefully adjusted as described in my copending application Ser. No. 698,859, filed June 23, 1976.

In this invention, coatings of high solids content are obtained which cure to form hard and exceptionally impact resistant films by combining a reactive copolymer with an aminoplast resin and a liquid bishydroxy ethyl ether of a bisphenol, alone or in combination with the corresponding bishydroxy propyl ether. These bishydroxy ethers of bisphenol uniquely combine good hardness with exceptional impact resistance and also provide good stain and detergent resistance, and the presence of the bishydroxy ethyl ether adds fluidity and flexibility with minimum loss in film hardness and chemical resistance.

The bishydroxy ethyl ethers of a bisphenol are disclosed in U.S. Pat. No. 3,960,983 where they are selected for their miscibility with water and used together with acidic copolymers which are neutralized with a base to render them water dispersible. Water is not used herein, and since the copolymers are not neutralized, water cannot be effectively added.

In the reactive copolymer, monoethylenic monomers including from about 5% to 20% by weight of monoethylenic monomer having a functional group reactive with N-methylol functionality and selected from carboxylic acid, hydroxy and amide groups, are copolymerized in an organic solvent solution containing a major proportion of the bishydroxy ethers of a bisphenol.

The term "bisphenol" denotes a pair of phenolic groups linked together through an intervening divalent alkylene group, and is preferably illustrated by bisphenol A.

Aminoplast resin is incorporated in the solution, and this provides a liquid coating composition which is essentially solvent free and which is sufficiently fluid to permit easy coating application at room or slightly elevated temperature.

Aminoplast resin is incorporated in the solution, and this provides a liquid coating composition which contains far less volatile organic solvent than is normally needed in a solvent solution coating and which is nonetheless sufficiently fluid to permit ordinary coating application at room or slightly elevated temperature.

Proportions are important to the preferred practice of this invention, and this requires the bishydroxy ethers to constitute from about 20% to 40% of the mixture while the reactive copolymers constitute from about 15% to 80% of the weight of the bishydroxy ethers. Continuing with the proportions which should be used, the reactive copolymer should constitute from about 4.5% to 35% of the mixture, and the balance of the mixture of the three components will consist essentially of aminoplast resin. It is also preferred to use at least about 0.8 part of aminoplast per part of reactive copolymer, preferably at least 1.5 parts per part of reactive copolymer.

Preferred proportions are 10% to 30% of reactive copolymer combined with 25% to 35% of the bishydroxy ethers and 30% to 70% of the aminoplast resin, there being at least 2 parts of bishydroxy ether per part of reactive copolymer.

In this description, and also in the claims, all parts and proportions are by weight unless otherwise noted.

The reactive copolymer and the bishydroxy ethers are both corrective with the N-methylol groups of the aminoplast resin, and cures take place at temperatures of about 250° F. and higher. Since the proportion of volatile organic solvent is reduced, there is a corresponding reduction in the amount of volatiles liberated during cure, and this reduces undesirable pollution of the atmosphere, and it also reduces cost and hazard.

The nonreactive monoethylenic monomers do not react during copolymerization or on subsequent baking, and are combined with reactive monomers to form a reactive copolymer, and these nonreactive monomers are subject to wide variation. Normally, monomers which provide hard homopolymers are relied upon to provide at least about 30% of the copolymer, preferably from 50% to 75%, these being especially illustrated by styrene and vinyl toluene, styrene being particularly preferred to maximize hardness and water resistance and thereby offset some of the softness introduced by the dihydric alcohol which is minimized by the nature of this particular type of dihydric alcohol. Other hardening monomers less desirably present are methyl acrylate, acrylonitrile, and vinyl acetate. Monomers providing soft homopolymers are also desirably included in amounts of at least about 20% of the copolymer. These are illustrated by ethyl acrylate, n-butyl acrylate, isobutyl acrylate, 2-ethylhexyl acrylate, and similar alkyl esters of monoethylenic carboxylic acids. Isobutyl acrylate is particularly preferred. The specific nature of the monoethylenic monomers constituting the balance of the acid copolymer is of secondary significance to this invention. In preferred practice, the nonreactive monoethylenic monomers contain the single ethylenic group as the sole functional group thereof, and constitute at least about 75% of the copolymer and, more preferably, the entire balance of the copolymer, except for the reactive monomer.

The reactive monomers do not react on copolymerization, but they do react with the aminoplast resin on subsequent baking. These reactive monomers may be of several types which may be used alone or in admixture with one another. Monoethylenic carboxylic acid monomers are preferred, but other reactive monoethylenic monomers may be used, such as amide monomers, for example, acrylamide or methacrylamide, or a hydroxy functional monomer such as hydroxyethyl acrylate or methacrylate. Hydroxy- or carboxy-functional polyesters may also be included in small amount as taught in my prior U.S. Pat. No. 3,163,615.

The preferred carboxylic monomers are illustrated by acrylic acid, methacrylic acid, crotonic acid, monobutyl fumarate, and the like. The reactive monomers will include the reactive groups noted, but no other reactive group.

The aminoplast resins constitute a conventional class of heat hardening condensates of polyamines with formaldehyde, and ethers thereof. Urea-formaldehyde, melamine-formaldehyde, and benzoguanamine-formaldehyde resins will illustrate this class of materials. Since fluidity at room temperature is a feature of the invention, liquid methyl ethers are preferred, such as hexamethoxy methyl melamine.

The bishydroxy propyl ethers which are useful herein are formed by reacting propylene oxide with the bisphenol. The oxide is used in at least a stoichiometric amount to insure that all of the phenolic OH is consumed by the reaction. Polyether formation may be encountered, especially if the oxide is used in excess, and this is permissible. Also, some condensation occurs and the product includes some dimers and trimers. The lowest molecular weight consistent with substantially complete removal of the phenolic OH groups is preferred. The reaction is easily carried out by heating the mixture of bisphenol and propylene oxide under pressure in the presence of a small amount of sodium hydroxide and water. The reaction itself is well known, and the product is available in commerce.

The result (ignoring polyether formation and condensation) is a bishydroxy propyl ether of the starting bisphenol having the formula:

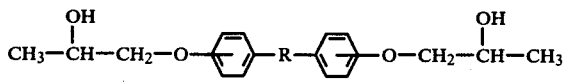

in which R is an alkylidene group containing from 1–20 carbon atoms, preferably from 2–6 carbon atoms. Using bisphenol A, R is the propylidene group, and the hydroxy propyl ether groups are in the para,para position.

The bishydroxy ethyl ethers can be made the same way using ethylene oxide and these ethers are more fully disclosed in said U.S. Pat. No. 3,960,983.

The proportion of ethylene oxide in the hydroxy ether can range from about 2 to about 10 moles of ethylene oxide per mol of the bisphenol, preferably proportions of from about 3 to about 9 moles of ethylene oxide per mole of the bisphenol, which is preferably bisphenol A.

While minor amounts of other polyhydric alcohols may be present in admixture with the bishydroxy ethers of a bisphenol, these are preferably absent because, and with the exception of tetrahydric adducts as in my said copending application, these lead to reduced stain resistance and reduced detergent resistance.

While volatile organic solvents are reduced to a minimum in this invention, small amounts thereof are usually needed to assist in dissolving the monomers during copolymerization, or to reduce viscosity after copolymerization to provide whatever final viscosity is desired at the time of application. Usually some volatile solvent (at least 5%) is needed, either to provide desired coating viscosity, or to assist in carrying out the solution copolymerization. This small amount of solvent evaporates during the cure and provides some limited pollution, but the volatile content is much smaller than is characteristic of solution coating compositions. The product properties obtained in this invention justify the presence of up to 30% of volatile organic solvent in the final coating solution, though in the preferred practice of this invention, the volatile organic solvent content would be less than about 20%.

The copolymerization is carried out by heating the solution of monomers in the bishydroxy ethers and optional volatile solvent in the presence of a free radical generating catalyst, such as a peroxide or equivalent catalyst, illustrated by azobisisobutyronitrile. Suitable temperatures for copolymerization may vary from 60° to 200° C., preferably from 80° to 150° C. The bishydroxy ethers should constitute a major portion of the solvent (more than 50%), preferably more than 75%.

Typical baking conditions in this invention are quite low, 275° F. for 20 minutes being typical. Lower temperatures require more time, and higher temperatures of about 500° F. allow the cure to be completed in a half minute to one minute.

The invention is illustrated in the following example.

EXAMPLE 1

Preparation of High Solids Polymer Containing Liquid Bishydroxy Ether of Bisphenol 630—Ethylene Oxide Adduct of Bisphenol A (about 6 moles of ethylene oxide per mol of the bisphenol)—see note 1

270—Butanol

Charge to reactor, set reflux condenser, and heat to 120° C.

295—Styrene

140—Isobutyl acrylate

45—Acrylic acid

13—Tertiary butyl perbenzoate

Premix monomers and catalyst, and add to reactor over 3 hours at 120° C., and then hold for one hour at 120° C.

3 Tertiary butyl perbenzoate

Add catalyst, and hold for one hour at 120° C. Then cool to 70° C.

525 Aminoplast resin (hexamethoxymethyl melamine)

Add aminoplast resin slowly at 70° C. and then cool to 25° C. to provide a mixture having the following final characteristics:

| | |
|---|---|
| Solids | 85.5% |
| Viscosity (Gardner-Holdt) | $Z_3$ |
| Acid Value | 22.6 |
| Color (Gardner) | 2 |

Solids Composition:
Note 1—The commercial product Dow Polyol XD 8025.01 is preferably used.

In comparison with Example 1 of U.S. Pat. No. 4,052,480, the viscosity in the foregoing example is lower ($Z_3$ as compared with $Z_4$-$Z_5$), and the final cured product has greater flexibility and impact resistance, and is almost as hard. The chemical resistance is not quite as good, but the bisphenol backbone in the polyhydric alcohol provides significantly greater hardness and chemical resistance than can be obtained with other dihydric polyether alcohols.

This example can be modified by adding the corresponding propyleneadduct of bisphenol A having an average molecular weight of 565 to the polyol, so as to provide a mixture of polyhydric alcohols. The greater the proportion of the propylene oxide adduct, the greater the hardness and the greater the chemical resistance, but some fluidity is sacrificed together with some film flexibility.

The invention is defined in the claims which follow.

I claim:

1. A fluid resinous coating composition containing less than about 30% of volatile organic solvent and which cures on baking, said coating composition consisting essentially of a mixture of:
   (1) a copolymer of monoethylenic monomers including from about 5-20% of monoethylenic monomer having a functional group reactive with the N-methylol group and selected from carboxylic acid, hydroxy, and amide groups, said copolymer being produced by copolymerization in an organic solvent solution containing a major proportion of component (2) below:
   (2) liquid bishydroxy ethyl ether of a bisphenol formed by reacting ethylene oxide with a bisphenol alone or in admixture with liquid bishydroxy propyl ether of a bisphenol formed by reacting propylene oxide with a bisphenol; and
   (3) an aminoplast resin; said copolymer constituting from about 4.5% to 35% of the mixture, the bishydroxy propyl ether constituting from about 20% to 40% of the mixture, and the balance of the mixture of the three components consisting essentially of aminoplast resin, there being at least about 0.8 parts of aminoplast resin per part of copolymer, and said copolymer being present in an amount of from about 15-80% of the weight of the bishydroxy propyl ether.

2. A coating composition as recited in claim 1 in which the copolymer is present in an amount of 10% to 30%, the bishydroxy ethers are present in an amount of from 25% to 35%, and the aminoplast resin is present in an amount of from 30% to 70%, there being at least 2 parts of bishydroxy ether per part of copolymer.

3. A coating composition as recited in claim 1 in which said bishydroxy ethers constitute at least about 75% of the organic solvent in which copolymerization is carried out.

4. A coating composition as recited in claim 1 in which the volatile organic solvent content of the coating composition is from 5-20%.

5. A coating composition as recited in claim 1 in which said monoethylenic monomer having a functional group reactive with the N-methylol group is a monoethylenic carboxylic acid.

6. A coating composition as recited in claim 5 in which the balance of the monoethylenic monomers in the copolymer consist of nonreactive monoethylenic monomers containing the single ethylenic group as the sole functional group thereof.

7. A coating composition as recited in claim 1 in which said aminoplast resin is hexamethoxy methyl melamine.

8. A coating composition as recited in claim 1 in which said bishydroxy ethers are provided by reaction of propylene oxide or ethylene oxide with bisphenol A.

9. A coating composition as recited in claim 8 in which said bishydroxy ethyl ether contains from about 2 to about 10 moles of ethylene oxide per mole of said bisphenol A.

* * * * *

UNITED STATES PATENT AND TRADEMARK OFFICE
CERTIFICATE OF CORRECTION

PATENT NO. : 4,178,325
DATED : Dec. 11, 1979
INVENTOR(S) : Kazys Sekmakas

It is certified that error appears in the above-identified patent and that said Letters Patent are hereby corrected as shown below:

Col. 2, line 38, "corrective" should read --coreactive--

Claim 1, Col. 5, last two lines of the column:

"bishydroxy propyl ether" should read --bishydroxy ethers--

Signed and Sealed this

Seventeenth Day of June 1980

[SEAL]

Attest:

SIDNEY A. DIAMOND

Attesting Officer     Commissioner of Patents and Trademarks